US010266139B2

(12) United States Patent
Staton et al.

(10) Patent No.: US 10,266,139 B2
(45) Date of Patent: Apr. 23, 2019

(54) AUTOMOTIVE TRANSPORTATION SYSTEMS AND METHODS FOR MONITORING ACTIVITY AND PROVIDING CONTROLLED RESPONSE (71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/801,626

(22) Filed: Nov. 2, 2017

(65) Prior Publication Data
US 2018/0118147 A1 May 3, 2018

Related U.S. Application Data (60) Provisional application No. 62/416,163, filed on Nov. 2, 2016.

(51) Int. Cl.
B60R 21/0134 (2006.01)
B60J 3/04 (2006.01)
B60R 21/0132 (2006.01)
B60R 21/0136 (2006.01)
(Continued)

(52) U.S. Cl.
CPC ............ B60R 21/0134 (2013.01); B60J 3/04 (2013.01); B60R 21/0132 (2013.01); B60R 21/0136 (2013.01); B60R 2021/0027 (2013.01); B60R 2021/01027 (2013.01); B60R 2021/01034 (2013.01); B60R 2021/01068 (2013.01)

(58) Field of Classification Search
CPC ........ B60R 21/0134; B60R 2021/0027; B60R 2021/01027; B60R 2021/01034; B60R 2021/01068; B60R 21/0132; B60R 21/0136; B60J 3/04
See application file for complete search history.

(56) References Cited

U.S. PATENT DOCUMENTS

| 4,690,960 A | 9/1987 | Yamauchi et al. |
| 4,860,851 A | 8/1989 | Krevor et al. |
| 5,902,656 A | 5/1999 | Hwang |

(Continued)

FOREIGN PATENT DOCUMENTS

GB 2520493 A 5/2015

OTHER PUBLICATIONS

PCT Application No. PCT/US17/59681, International Search Report and Written Opinion, dated Oct. 4, 2018.

Primary Examiner — Jerrah Edwards
(74) Attorney, Agent, or Firm — Lathrop Gage L.L.P.

(57) ABSTRACT

In one embodiment, a vehicular monitoring and controlled response system includes a substance having a plurality of particles dispersed therein, the particles being tunable in response to an external stimulus; a sensor for measuring a disruption to a vehicle; and a computing device in communication with the sensor and the vehicle. The computing device has non-transitory computer readable medium with computer executable instructions stored thereon executed by a digital processor to analyze data received by the sensor; determine a magnitude of the external stimulus based on the data received by the sensor; and activate the external stimulus.

41 Claims, 3 Drawing Sheets (51) Int. Cl.
*B60R 21/01* (2006.01)
*B60R 21/00* (2006.01)

(56) References Cited

U.S. PATENT DOCUMENTS

| | | |
|---|---|---|
| 5,946,866 A | 9/1999 | Weglewski et al. |
| 6,475,559 B1 | 11/2002 | Bettinger |
| 6,565,147 B1 | 5/2003 | Beals |
| 8,048,471 B2 * | 11/2011 | Nesbitt ............ A61L 29/106 |
| | | 427/2.1 |
| 8,144,889 B2 | 3/2012 | Cheng et al. |
| 9,371,669 B2 | 6/2016 | Berg et al. |
| 9,759,286 B1 | 9/2017 | Staton et al. |
| 9,944,242 B2 * | 4/2018 | Higashimachi ........ B60R 19/04 |
| 2006/0155036 A1 | 7/2006 | Ackermans |
| 2007/0138583 A1 | 6/2007 | Ofek et al. |
| 2008/0085405 A1 | 4/2008 | Prenzel et al. |
| 2008/0139722 A1 | 6/2008 | Shefelbine et al. |
| 2009/0050428 A1 | 2/2009 | Kloucek et al. |
| 2009/0142579 A1 | 6/2009 | Smith |
| 2009/0162530 A1 * | 6/2009 | Nesbitt ............ A61L 29/106 |
| | | 427/2.3 |
| 2009/0326140 A1 | 12/2009 | Shimada et al. |
| 2010/0089772 A1 | 4/2010 | Deshusses et al. |
| 2010/0108306 A1 | 5/2010 | Cooper |
| 2011/0051775 A1 | 3/2011 | Ivanov et al. |
| 2011/0171137 A1 | 7/2011 | Patolsky et al. |
| 2012/0082806 A1 * | 4/2012 | Kissell ................ C09D 5/24 |
| | | 428/34.1 |
| 2016/0040743 A1 | 2/2016 | Staton |
| 2016/0107570 A1 | 4/2016 | Morarres et al. |
| 2016/0347270 A1 * | 12/2016 | Higashimachi ........ B60R 19/04 |
| 2016/0363727 A1 | 12/2016 | Suntsova et al. |

* cited by examiner

AUTOMOTIVE TRANSPORTATION SYSTEMS AND METHODS FOR MONITORING ACTIVITY AND PROVIDING CONTROLLED RESPONSE

CROSS-REFERENCE TO RELATED APPLICATIONS

This application claim priority to U.S. Provisional Patent Application No. 62/416,163, filed Nov. 2, 2016, which is incorporated by reference herein in its entirety.

BACKGROUND

Automobiles and other vehicles are ubiquitous. Unfortunately, these machines can be very dangerous. In the U.S., 33% of deaths among 13 to 19 year-olds occurred in motor vehicle crashes. It is therefore advantageous to provide systems in, on, and around the motor vehicle that can make the vehicle safer, potentially preventing life-threatening situations.

SUMMARY

The following presents a simplified summary of the invention in order to provide a basic understanding of some aspects thereof. It is not an extensive overview of the invention. It is not intended to identify critical elements of the invention or to delineate the scope of the invention. Its sole purpose is to present some concepts of the invention in a simplified form as a prelude to the more detailed description that is presented below.

In one embodiment, a vehicular monitoring and controlled response system includes a substance having a plurality of particles dispersed therein, the particles being tunable in response to an external stimulus; a sensor for measuring a disruption to a vehicle; and a computing device in communication with the sensor and the vehicle. The computing device has non-transitory computer readable medium with computer executable instructions stored thereon executed by a digital processor to analyze data received by the sensor; determine a magnitude of the external stimulus based on the data received by the sensor; and activate the external stimulus.

In another embodiment, a vehicular monitoring and controlled response system, includes a sensor for preemptively anticipating an impact upon a vehicle, the sensor being disposed on a bumper of a vehicle; and a computing device in communication with the sensor and the vehicle. The computing device includes non-transitory computer readable medium with computer executable instructions stored thereon executed by a digital processor to analyze impact data received by the sensor; and activate an airbag of the vehicle upon the impact data reaching a predetermined threshold. Activation of the airbag or other safety absorption devices occurs substantially instantaneously upon impact.

WRITTEN DESCRIPTION

Vehicles today are highly intelligent pieces of equipment with many systems and subsystems operating simultaneously allowing the vehicle to function. Many of these systems and subsystems are controlled by inputs from the operator of the car. However, most of the systems and subsystems are open-loop closed systems, meaning that they do not communicate with the other systems and/or subsystems. Further, many of the systems and/or subsystems are reactive, in that safety mechanisms (e.g., the airbag, shock absorbers, etc.) are deployed only after an incident. Embodiments of automotive systems and methods for sensing, monitoring, and/or controlling activity in a motor vehicle are described herein.

In one embodiment, a motor vehicle is equipped with one or more sensors configured to monitor activity in and around the vehicle. The sensors may include, but are not limited to visual, photonic, audio, sonic, sub-sonic, motion, electromagnetic fields, pressure, and temperature sensors, and/or sensors for determining a force of an impact received or anticipated upon the vehicle. Anticipated impacts can be determined by utilizing algorithms based on trending data histograms that are received and collected from a single sensor or multiple sensors. Algorithm pre-alarms can be triggered based on spatial and temporal extrapolated curves by approximating object positions and trending trajectories within a virtual three-dimensional simulation environment processed in real-time. The sensors may be distributed on or around the vehicle at one or more locations for the purpose of receiving and transmitting information to and from the systems described herein. In embodiments, as will be understood from the additional description provided below, a single particle (or group of particles) may be configured as a multi-mode particle (e.g., a piezo element) that can both sense and provide a controlled response simultaneously. For purposes of the description provided herein, it shall be understood that the use of "sensor" may encompass any sensor now known or later developed, including but not limited to mixed or multi-mode particles.

Figure 1:
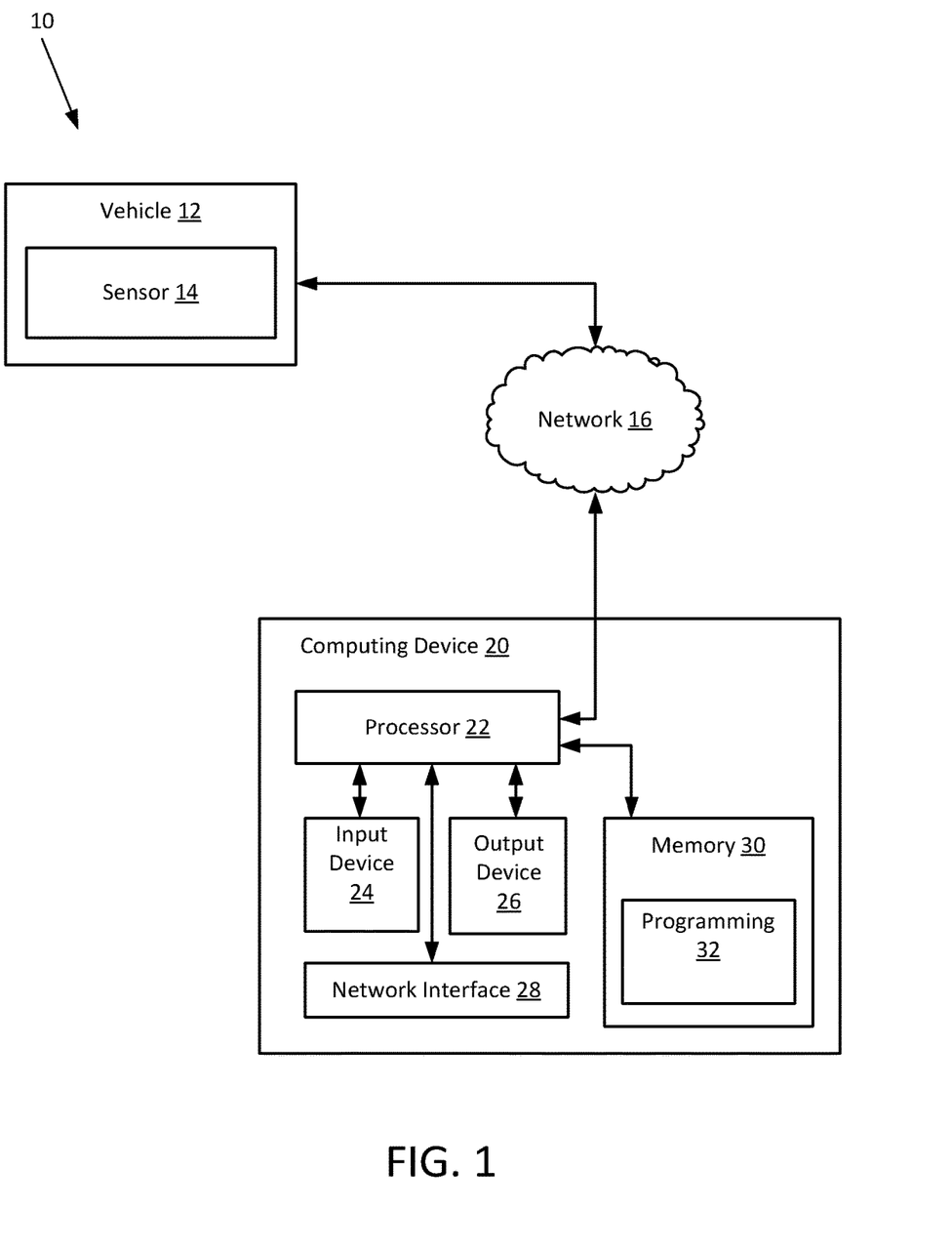
FIG. 1 is a schematic representation of a vehicle system according to an embodiment of the invention.
Figure 2:
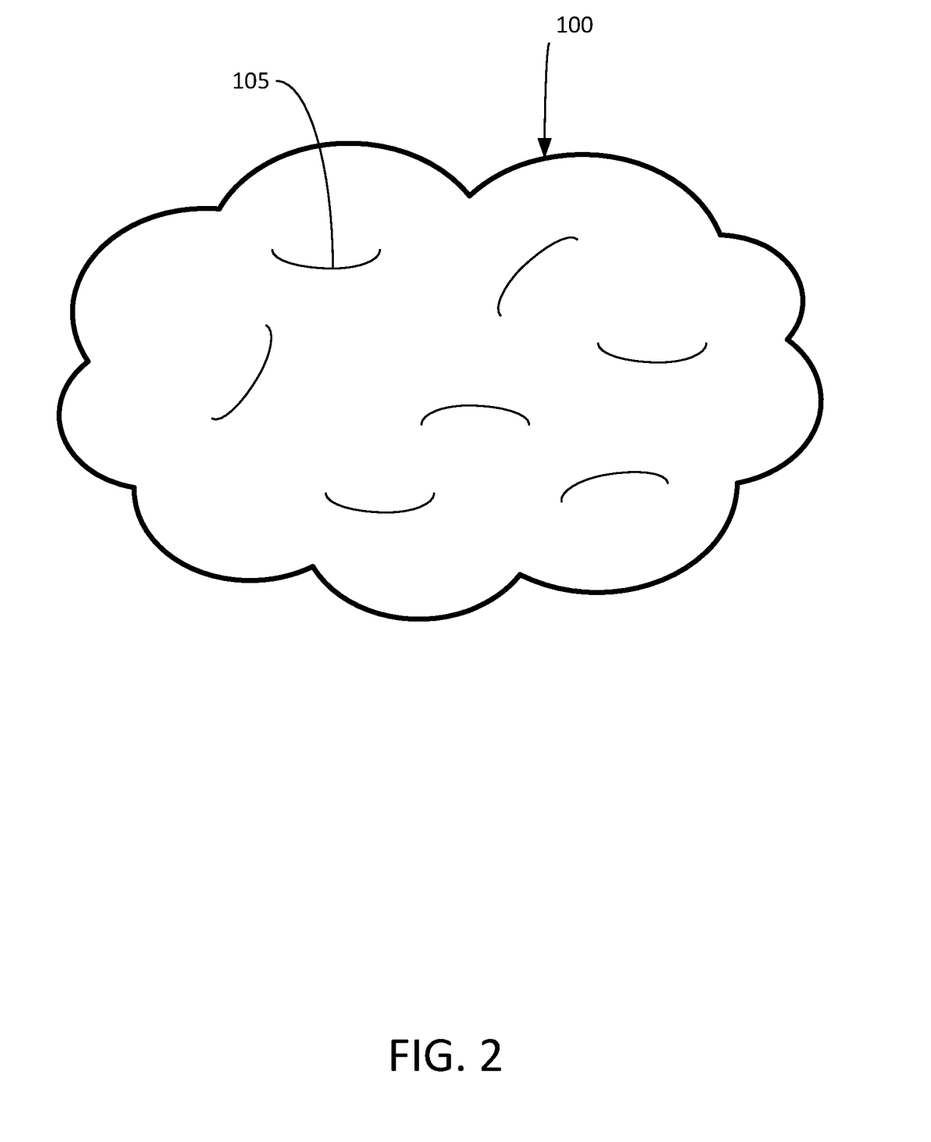
FIG. 2 is an illustration of a sub-system of a vehicle system according to an embodiment of the invention.

FIG. 1 illustrates a schematic representation of a system 10 having a vehicle 12 with a sensor 14 incorporated therein or thereon. The sensor 14 is in communication with a computing device 20 over a network 16. The computing device 20 includes a processor 22, an input device 24 (e.g., input keys, buttons, switches, etc.), an output device 26 (e.g., a display, a speaker, a warning light, instructions for providing a controlled response, etc.), a network interface 28, and memory 30. Programming 32 (or algorithms) may be permanently or temporarily stored in the memory 30 directed generally to analyzing data from the various sensors 14 distributed on or in a vehicle and effecting a controlled response by the vehicle 12 and/or the systems disposed therein or thereon.

The functionality of at least some of the input 24 and output 26 devices may be combined (e.g., as a display screen or projection). The input devices 24 may further include the sensors 14 which may be in wireless communication with the computing system 20. Further, the output devices 26 may be various systems distributed within, on, or around the vehicle, as described in greater detailed below, which may be controlled through controls in communication with the computing device 20.

The computing system 20 may be a desktop computer, a laptop computer, a smart phone, a tablet, a web or other server, etc. In embodiments, the computing device may be adapted to send and receive data as part of a distributed communication system in line with the teachings of the present disclosure. In embodiments, the sensor 14 and the computing device 20 may be implemented as a single device (or particle, as described below) which may be configured to act as both a sensing and controlled response mechanism in line with the teachings herein.

The processor 22 may be in data communication with the network interface 28. The processor 22 represents one or more digital or analog processors. Network interface 28 may be implemented as one or both of a wired network interface and a wireless network interface, as is known in the art. The input device 24 may include a keyboard, a mouse, a stylus pen, buttons, knobs, switches, sensors, and/or any other device that may allow a user to provide an input to the computing device 20. In some embodiments, the input device 24 may comprise a media port (such as a USB port or a SD or microSD port) to allow for media (e.g., a USB drive, a SD or micro SD drive, a laptop memory, a smart phone memory, etc.) to be communicatively coupled to the computing device 20. The output device 26 may include one or more visual indicators (e.g., a display), audible indicators (e.g., speakers), vehicle sub-systems (e.g., coatings, air conditioning systems, alarms, mechanically operated windows, etc.) or any other such output device now known or subsequently developed. In some embodiments, at least a part of the input device 24 and the output device 26 may be combined. A user may functionally interact with the distributed control system 10 through the vehicle 12, and/or through the computing device 20, using the input device 24 and the output device 26.

Memory 30 represents one or more of volatile memory (e.g., RAM) and non-volatile memory (e.g., ROM, FLASH, magnetic media, optical media, etc.). Although shown within the structure, memory 30 may be, at least in part, implemented as network storage that is external to the structure and accessed via the network interface 28. The memory 30 may house software 32, which may be stored in a transitory or non-transitory portion of the memory 30. Software 32 includes machine readable instructions that are executed by processor to perform the functionality described herein. In some example embodiments, the processor 22 may be configured through particularly configured hardware, such as an application specific integrated circuit (ASIC), field-programmable gate array (FPGA), etc., and/or through execution of software (e.g., software) to perform functions in accordance with the disclosure herein.

The software 32 may include instructions for receiving information from sensors 14 distributed throughout the vehicle 12 (on or in the vehicle 12), analyzing the data, and sending a signal to effectuate a controlled response by one or more of the distributed communication system components (e.g., such as the coatings, substances, or other sub-systems described herein). The software 32 may be programmable by a user according to the user's preferences (e.g., regarding temperature, humidity, amount of desired sunlight, etc.).

Moving on to the various sub-systems of the vehicle which may benefit from the inventions described herein, one area of the vehicle that is relatively unsophisticated is the window, including the rear and forward windshields, and even passenger windows. Currently, a driver (or passenger) must provide an input to the vehicle to signal that a window is frosted or fogged over. Because it requires human intervention, often the input does not occur until there is already a visual indication that the human can appreciate. Typically, this is turning a dial or pressing a button to activate a defrost mode. In most vehicles, this results in the air velocity simply being increased. Occasionally, the temperature of the air may be modified. However, the defrosting or defogging requires air to be blown from the inside of the vehicle towards the windows. Additionally, it may not be possible to isolate the defogging or defrosting to a single window; rather, the air is concentrated on defogging, which may make the interior of the cabin uncomfortable for the passengers.

In an embodiment of the invention, temperature sensors may be located, for example, in and/or on the windows of a vehicle to monitor the temperature inside and/or outside of the vehicle. Optionally, the sensors may be configured to further monitor the humidity level inside and/or outside of the vehicle. If the sensor(s) determines that the humidity inside the car has reached a certain threshold level, and that the temperature outside is such that it is likely to cause the window to fog over, the sensor may communicate with the air conditioning system to automatically turn on the defroster to the front window, the rear window, or both. Algorithms utilizing multiple in-cabin and outside sensor readings may be utilized to perform controlled responses that are automated in function based on differential states between various location in and around the vehicle.

In embodiments, the windows may be formed of one or more layers. Material encapsulated within the layers may be configured and controlled to visually darken, diffuse, warm, or cool the glass itself in a controlled response to the measurements retrieved from inside and/or outside the vehicle. The material encapsulated within the window layers may be a film, coating, layer, glaze, or other substance having particles dispersed therein, such as the substance described in U.S. patent application Ser. Nos. 15/365,923 and 15/678,392, which are incorporated by reference herein in their entireties. FIG. 1 illustrates a substance 100 having a plurality of three-dimensional particles 105 dispersed therein. The particles contained within the substance may take any of a number of configurations, and may be altered in state based on electrical, thermal, and frequency stimuli to provide the controlled response. As described therein, when the particles receive a stimulus, the particles are altered such that properties of the material may be changed. For example, the particles may be re-oriented in response to the stimulus which may cause the window to appear frosted (e.g., if it is desirable for others to not be able to see through the window). Or, the particles may be re-oriented in such a way that the window is visually darkened, whereby sunlight hitting the window may cause the window to absorb heat, which may in turn aid in heating the window itself, and/or interior of the vehicle.

In embodiments, the stimulus provided to the particles may excite the particles, causing them to oscillate (e.g. crystalline structures such as quartz). The oscillations may generate a sufficient amount of heat to heat the window. Accordingly, it may be possible to defrost (or defog) a window without having to engage the heater or the air conditioner in the vehicle. Electrical stimulation or excitation may be used to initiate particle motion over time including electron flow via conduction through a variety of materials (e.g. Indium Tin Oxide—ITO) that are conductive or create a chain of energy flow when excited by AC, DC or electromagnetic waveforms.

In still other embodiments, the particles may be altered in such a way that the durometer or viscosity of the inner layer is changed, either in response to an impact upon the window or preemptively based on a sensed likelihood of an imminent impact upon the window. For example, a sensor (such as a camera, video camera, or other sensor configured to sense movement or impact) may be provided on a vehicle to sense when a vehicle is about to or has collided with another object. When the sensor senses such an impact (or imminent impact), a stimulus may be provided to the particles, causing them to re-orient in the direction of the impact. Alternately, the state of the particles may change (e.g., from stiff to flexible). When the impact occurs, the particles absorb and redistribute some of the impact, thus potentially preventing the windows from breaking. Accordingly, the particles may provide material changes in hardness in order to provide shock absorbing properties to the window. Electrochemical modes may be used to trigger an electrical charge that promotes a chemical reaction among or within the particles. Electrochemical reactions may be realized in a one-time reaction mode or multi-recharging modes.

However, it shall be understood that the particles may additionally provide for the selective transfer of less significant impacts upon the window, including sound, and/or light waves that hit the window. Frequencies of these waveforms of impact are inclusive but not limited to the perception range of humans (generally termed as visible light or in sound as 20 Hz to 20,000 Hz). Thus, the window may be configured to reduce the amount of sound (or noise) travelling through the window. In still another embodiment, the particles may be re-oriented, in response to a stimulus, in such a way that the window may serve as a sound amplifier (or resonant tuned tank). Accordingly, for example, the vehicle may be in a location in which it is desirable to hear the noise from the outside more clearly, but it is undesirable to roll down the window. In such instances, a stimulus may be provided to the window(s) causing the particles to align in such a way that the sound is amplified into the vehicle, allowing the passengers to more clearly hear the noise from outside.

In an embodiment, the substance may be configured as a conformal coating, such as a paint, spray paint, resin, etc. The vehicle may be covered in the resin, which may appear to a consumer simply as paint. However, the particles in the resin may be tunable in response to a stimulus, such as an electric or magnetic field, acting upon the resin. Activation of the external stimulus may cause reorientation of the particles, which may change the perceivable color of the resin. The intensity of the external stimulus may be increased or decreased to influence the particles to provide multiple apparent color options. A consumer may thus be able to change the color of his or her vehicle. Additionally, in embodiments, the stimulus may be selectively applied to areas of the vehicle, allowing the user to selectively alter the apparent color of the resin. The particles may also be configured to change the effective tackiness or grit level of the surface enabling the ability to adhere to other surfaces or objects.

The benefits of such resins may be greater than simply changing color, however. As described above, that the durometer (or hardness) of the resin may be manipulated by applying the external stimulus. By orienting the particles in a particular direction, for example, the resin may be able to dampen forces that are received by the vehicle itself. Sensors (e.g., motion sensors) may anticipate impacts upon the vehicle, which, via programming, may cause activation of the external stimulus to preemptively alter the orientation and/or flexibility of the particles prior to an impact.

Additionally, the coating may further be able to serve as a monitor of the health of the vehicle. For example, the particles (e.g., piezo elements, C-60, carbon nanotubes—CNT, graphene) may be able to sense impacts upon a surface and transfer (e.g., over the network 16) information about those impacts to the computing device 20 such that the health of building material may be monitored. As noted briefly above, particles may be configured to operate in mixed mode, dual mode or multiplexed mode which allows the programmable material particles to be used as sensor, passive mechanical damping elements and active dynamic controlled response elements simultaneously or at different discrete periods in time. The advanced features provided and enabled by multi-mode particle operation can allow a particular particle or particle group to perform sensory functions and provide dynamic controlled response. Some particles may operate in sensor mode all of the time while others can be selectively switched to a dynamic controlled response mode based on distributed communication and or system programming and profiled parameters. In still other advanced modes such as a closed-loop tuned mode, a particle or group of particles can be excited by a varying waveform and may also monitor the variations of applied force distortion as a sensor indication of error offset feedback. In these embodiments, a particle is operational as a sensor and control device at the same time. The error offset feedback is monitored as a sensor input and can be waveform cancelled in order to provide enhancements to the control signal which in turn can be used to reduce distortion to the desired controlled response of the overall system. One example of a particle that can support mixed mode functions is a piezo element, which can be used as both an output annunciator and a displacement sensing transducer simultaneously. The particles may even be equipped with a read-write memory mode, which may allow the particle to store information in memory concerning the vehicle 12 to which it is applied. Stored information may be visible or indicated in such a way that the information can be machine readable and/or directly human readable (e.g. particles contained within color changing labels, placards and icons). The resulting information displayed may also have attributes that exhibit the ability to reflect light or luminesce. The information may be transmitted, e.g., over the network 16, to the computing device 20. The vehicle 12 can thus be monitored remotely. Such real-time monitoring may be useful for managing the life of the vehicle 12 by alerting the building owner to potential issues in the material before complete failure thereof.

As will be understood by those of skill in the art, the coating 100 may be further distributed under the vehicle 12, to counteract sound (or noise) waves entering the vehicle through the bottom of the vehicle. Sensors located at the underside of the vehicle may measure the soundwaves received thereupon, which may be transmitted over the network 16, which may be analyzed by the software 32 in order to determine a strength of the external stimulus to the coating in order to counteract the soundwaves. The external stimulus may cause the particles to oscillate in a wave pattern that is opposite (or strategically phase and amplitude related to) the soundwaves received upon the underside of the vehicle 12 in order to cancel out the soundwaves. Because the soundwaves received upon the vehicle 12 (both the underside of the vehicle 12 and at other locations of the vehicle 12) are not constant, the sensor may sense in real-time such that the external stimulus to the particles may also be updated in real time, ensuring the best possible user experience.

In yet another embodiment, the substance 100 may be configured for distribution on certain housings of the vehicle. As has been described, the substance 100 may be altered by providing a stimulus thereto that causes some change in the material properties of the substance. This may be particularly useful for housings that hold especially sensitive pieces of equipment. For example, automotive lead-acid battery housings are currently simply metal or plastic housings that strap the vehicle's battery into place.

However, the constant vibration that the battery experiences simply by being in the vehicle is detrimental to the health of the battery, which may cause premature failure. More advanced batteries (e.g. nickel metal hydride—NIMH and lithium ion) contain active electronic circuitry and safety chemical seals making them more susceptible to shock and vibration failure. The same is true of vehicle motors—the more vibrations that the motor experiences, the more likely something may fail. Accordingly, the housings may be coated in the substance 100. As described above, sensors may sense the vibrations to the housings, and a controlled response may be effectuated by an external stimulus particularly configured for the vibrations experience by the housing. The vibrations to the equipment may thus be reduced (or offset of resonance), therefore potentially reducing undesirable effects thereupon.

Figure 3:
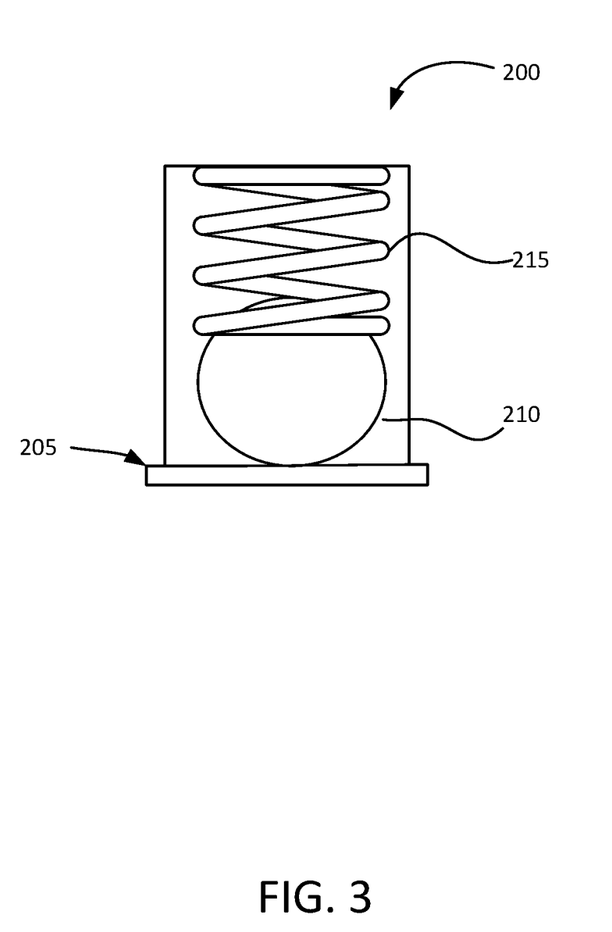
FIG. 3 is an illustration of an apparatus for dispersing impact forces according to an embodiment of the invention.

In still another embodiment of the invention, illustrated in FIG. 3, window absorption sensors 200 may be located, for example, in or on windows 205 of a motor vehicle. The absorption sensors 200 may include a contact member 210 and a biasing member 215. The biasing member 215 biases the contact member 210 toward a surface of the window 205. When the window 205 receives an impact, the contact member 210 may transfer a first portion of the force from the contact member 210 to the biasing member 215, moving the contact member from a first position to a second position. The biasing member 215 may then cause the contact member 210 to return to the first position, whereby a second portion of the force transferred to the biasing member is returned to the window 205, though the second portion is less than the first. The absorption sensor may thus prevent the windows from breaking and/or cracking.

In a further embodiment of the invention, the vehicle 12 may be equipped with bumper absorption sensors. The bumper absorption sensors may be substantially similar to the window absorption sensors 200 in construct and in their ability to receive and/or transfer some of the force received by a vehicle as a result of an impact. Thus, by incorporation of the bumper absorption sensors into and/or on the bumper of a vehicle, damage to the vehicle and/or injuries to the vehicle's occupants may be reduced. Bumper absorption sensing and controlled response may additionally be extended to other surfaces and materials throughout the vehicle.

The bumper absorption sensors may be further configured to quickly communicate a path of impact from the point of impact throughout the systems and sub-systems of the vehicle. Currently, sensors are provided in a location of the vehicle such that there is a delay between when the vehicle receives an impact and when the airbags are deployed. The bumper absorption sensors may be able to detect an impact and immediately cause the airbags to deploy in a localized controlled response to the impact (e.g., via communication over the network 16 in conjunction with the software 32). The immediate deployment of the airbags may save precious time that could significantly influence the likelihood of injuries to vehicle occupants.

The bumper absorption sensors may also be configured to provide a subsequently controlled response within others of the various subsystems within the vehicle. For example, after the airbags are deployed, the sensors may then transmit a signal (e.g., over the network 16) which causes the engine to shut down or enter a safety mode. Another signal may cause the vehicle to override the manual input of the gearshift to place the vehicle in a "park" configuration to prevent further movement of the vehicle. Still other signals may cause additional responses throughout the vehicle.

Optionally, the signals are triggered as a result of a particular threshold being met. For example, if a particular force is received greater than a predetermined threshold, then a response (or multiple responses) occurs. But if the force is less than the predetermined threshold, then there is no automatic response.

As briefly described above, sensors may be configured to provide preemptive controlled responses. For example, sensors incorporated into multiple vehicles may be configured to recognize an impact between the vehicles before the impact occurs in order to effectuate responses in both vehicles (or a group of vehicles) prior to impact. Sensors in a first vehicle may be configured to recognize when the first vehicle is within a predetermined distance from a second vehicle, wherein the second vehicle is also equipped with sensors. Upon achieving the predetermined distance, various signals, such as those described above, may be transmitted (e.g., over a network, such as network 16) in order that the controlled responses may be achieved by each vehicle. One example could be a controlled modulated magnetic waveform propagated in cooperation between two vehicles that creates an inverse pole reaction to avoid impact by preventing collision of the two vehicles. The resulting magnetic waveform patterns would result in a controllable force field between the vehicles.

The absorption sensors may be configured to record (and optionally transmit, e.g., over a network such as network 16) data regarding the impact force received by the vehicle. This information may be provided, for example, to vehicle manufacturing companies which may be useful in the design of new motor vehicles. Or, in embodiments, the information may be provided to a medical professional, which may be useful for correlating the impact with possible medical outcomes (e.g., concussions).

In another embodiment, sensors may be distributed at or near the shock absorbers in a vehicle. Preferably, an array of sensors is distributed near the shock absorbers. The array of sensors may scan the ground ahead of the vehicle for areas that may cause a disturbance (e.g., potholes, speed bumps, etc.). The shock absorbers, which may be equipped with electronics to open and/or close check valves in response to information from the sensors in order to better anticipate the disturbances ahead of the vehicle. In this way, the vehicle may be able to preemptively prepare for the disturbances and provide a response via the shock absorbers to prevent significant disruption to the vehicle and the vehicle's occupants.

Optionally, assistive monitoring and relay station devices may interact with the vehicle(s) in order to maximize the benefits to the vehicle's internal sensory and control system. Relay station devices may assist in communication aggregation as well as provide algorithm assisted directives to individual vehicles within a group (or cluster) of vehicles on a roadway. The relay station devices could reside on lighting poles, mile-marker signs, bridges, drones, or other structures including the roadway material itself. Automated vehicle systems may share information through a roadway management protocol that promotes collision prevention and overall roadway safety. Relay station devices may also communicate to backhaul communication towers in a meshed network to provide an overall ubiquitous communication system.

Many different arrangements of the described invention are possible without departing from the spirit and scope of the invention. Embodiments of the invention are described herein with the intent to be illustrative rather than restrictive. Alternative embodiments will become apparent to those skilled in the art that do not depart from its scope. A skilled artisan may develop alternative means of implementing the disclosed improvements without departing from the scope of the invention.

Further, it will be understood that certain features and subcombinations are of utility and may be employed without reference to other features and subcombinations and are contemplated within the scope of the invention. Not all steps listed in the various figures and description need to be carried out in the specific order described. The description should not be restricted to the specific described embodiments.

The invention claimed is:

1. A vehicular monitoring and controlled response system, comprising:
   a substance comprising a plurality of particles dispersed therein, the particles being tunable in response to an external stimulus;
   a sensor for measuring a disruption to a vehicle; and
   a computing device in communication with the sensor and the vehicle, the computing device comprising non-transitory computer readable medium with computer executable instructions stored thereon executed by a digital processor to:
   analyze data received by the sensor;
   determine a magnitude of the external stimulus based on the data received by the sensor; and
   activate the external stimulus, wherein the external stimulus is activated in a waveform pattern, the waveform pattern being opposite of a waveform ascertained by the sensor.

2. The system of claim 1, wherein the substance is dispersed as a resin on the vehicle.

3. The system of claim 2, wherein the sensor is selected from the list consisting of: a temperature sensor, a pressure sensor, a proximity sensor, and a motion sensor.

4. The system of claim 3, wherein the sensor is a temperature sensor and the external stimulus causes a change in the apparent color of the resin in response to the temperature determined by the temperature sensor.

5. The system of claim 3, wherein the sensor is a pressure sensor and the external stimulus causes a change in the durometer of the resin in response to an impact upon the vehicle.

6. The system of claim 1, wherein the external stimulus is an electric or magnetic field.

7. The system of claim 1, wherein the computing device is remote from the vehicle.

8. The system of claim 1, wherein the external stimulus causes a change in a durometer of the substance.

9. The system of claim 1, wherein the external stimulus causes a change in an orientation of the particles within the substance.

10. The system of claim 1, wherein the sensor is selected from the list consisting of: a temperature sensor, a pressure sensor, a proximity sensor, and a motion sensor.

11. The system of claim 1, wherein the computing device comprises an input device for receiving input data from a user.

12. The system of claim 11, wherein the input data is a predetermined threshold of the magnitude of the disruption to the vehicle, and wherein the external stimulus is activated upon the sensor determining that the magnitude of the disruption to the vehicle has reached the predetermined threshold.

13. The system of claim 12, wherein the disruption is a sound wave.

14. The system of claim 12, wherein the disruption is a vibration of the vehicle.

15. The system of claim 1, wherein the sensor is at least one of the plurality of particles.

16. The system of claim 15, wherein the sensor is a piezo element.

17. The system of claim 1, wherein the computing device stores the sensor data in a database.

18. The system of claim 2, wherein the vehicle is an airplane.

19. The system of claim 2, wherein the vehicle is a boat.

20. A monitoring and controlled response system, comprising:
    a substance, dispersed between a first and second layer of a first window, comprising a plurality of particles dispersed therein, the particles being tunable in response to an external stimulus;
    a sensor for measuring a disruption to the vehicle; and
    a computing device in communication with the sensor and the vehicle, the computing device comprising non-transitory computer readable medium with computer executable instructions stored thereon executed by a digital processor to:
    analyze data received by the sensor;
    determine a magnitude of the external stimulus based on the data received by the sensor; and
    activate the external stimulus.

21. The system of claim 20, wherein the sensor is an impact sensor disposed on the window.

22. The system of claim 21, wherein the external stimulus applied to the substance causes a change in the durometer of the substance in response to an impact upon the window.

23. The system of claim 20, wherein the sensor is a temperature sensor.

24. The system of claim 23, wherein, upon reaching a predetermined temperature threshold, the external stimulus is automatically activated, the external stimulus causing the particles in the substance to oscillate, thereby generating heat.

25. The system of claim 20, wherein the sensor is a proximity sensor for determining a likelihood of an impact to the vehicle, and wherein the external stimulus is activated prior to the impact as determined by the proximity sensor.

26. The system of claim 20, wherein the substance is disposed between a first and second layer of a second window, wherein the external stimulus is activated for the second window independent of the first window.

27. The system of claim 20, wherein the sensor is one of the plurality of particles.

28. The system of claim 27, wherein the sensor is a piezo element.

29. A vehicular monitoring and controlled response system, comprising:
    a substance comprising a plurality of particles dispersed therein, the particles being tunable in response to an external stimulus;
    a sensor for measuring a disruption to the vehicle; and
    a computing device in communication with the sensor and the window, the computing device comprising non-transitory computer readable medium with computer executable instructions stored thereon executed by a digital processor to:
    analyze data received by the sensor;
    determine a magnitude of the external stimulus based on the data received by the sensor; and
    activate the external stimulus;
    wherein:

the substance is applied to a battery housing of the vehicle; and the sensor measures the amplitude and frequency of vibrations of the housing as a result of vehicle movement.

30. The system of claim 29, wherein the external stimulus causes the particles to oscillate in a controlled response to the vibrations, the oscillations causing an inverse waveform to act upon the vibrations of the housing.

31. The system of claim 29, wherein the substance is further applied to a housing of a second automotive component.

32. The system of claim 31, wherein the automotive component is at least one of a head light, a tail light, an automotive thermostat, or a fuse panel.

33. The system of claim 29, wherein the sensor is one of the plurality of particles.

34. The system of claim 33, wherein the sensor is a piezo element.

35. The system of claim 29, further comprising a temperature sensor, wherein the temperature sensor is configured to activate the external stimulus upon the temperature sensor determining a temperature below a predetermined lower threshold, thereby causing the particles to oscillate to generate heat.

36. The system of claim 35, wherein the external stimulus is automatically deactivated upon the temperature sensor measuring a temperature above a predetermined upper threshold.

37. A vehicular monitoring and controlled response system, comprising:

a substance, applied to an underside of the vehicle, comprising a plurality of particles dispersed therein, the particles being tunable in response to an external stimulus;

a sensor for measuring a disruption to the vehicle; and a computing device in communication with the sensor and the window, the computing device comprising non-transitory computer readable medium with computer executable instructions stored thereon executed by a digital processor to:

analyze data received by the sensor;

determine a magnitude of the external stimulus based on the data received by the sensor; and activate the external stimulus;

wherein the sensor is an audio sensor for measuring sound waves through the vehicle into a cabin thereof.

38. The system of claim 37, wherein the external stimulus causes a change in state of the particles which cancels out the sound waves.

39. The system of claim 37, wherein the external stimulus causes a change in orientation of the particles.

40. The system of claim 37, wherein the sensor is one of the plurality of particles, and the sensor is a piezo element.

41. The system of claim 38, wherein the change in state is an oscillation of the particles.

* * * * *